United States Patent [19]
Walla

[11] 3,881,054
[45] Apr. 29, 1975

[54] METHOD AND CIRCUIT ARRANGEMENT FOR INDEPENDENTLY CONTROLLING THE CONTRAST AND BRIGHTNESS ADJUSTMENT OF AN IMAGE RECEIVER, MORE PARTICULARLY IN VIDEOTELEPHONE SUBSCRIBER STATIONS

[75] Inventor: Klaus Walla, Gauting, Germany

[73] Assignee: Siemens Aktiengesellschaft, Berlin and Munich, Germany

[22] Filed: June 26, 1973

[21] Appl. No.: 373,735

[30] Foreign Application Priority Data

July 5, 1972 Germany............................ 2232994

[52] U.S. Cl. ......................... 178/7.3 R; 178/7.3 DC
[51] Int. Cl............................. H04n 5/18; H04n 5/44
[58] Field of Search......... 178/7.3 R, 7.3 PC, 7.5 R, 178/7.5 DC, DIG. 26, DIG. 29; 179/2 TV

[56] References Cited

UNITED STATES PATENTS

| | | | |
|---|---|---|---|
| 3,217,100 | 9/1965 | Voeckler | 178/DIG. 26 |
| 3,569,620 | 3/1971 | Baun | 178/7.3 DC |
| 3,604,844 | 9/1971 | Ross | 178/5.4 AL |
| 3,760,099 | 9/1973 | Kong | 178/7.3 R |
| 3,777,056 | 12/1973 | Pieters | 178/DIG. 26 |

FOREIGN PATENTS OR APPLICATIONS

| | | | |
|---|---|---|---|
| 523,075 | 7/1940 | United Kingdom | 178/7.5 R |
| 754,611 | 8/1956 | United Kingdom | 178/DIG. 26 |

*Primary Examiner*—Robert L. Griffin
*Assistant Examiner*—George G. Stellar
*Attorney, Agent, or Firm*—Schuyler, Birch, Swindler, McKie & Beckett

[57] ABSTRACT

A method is disclosed which is particularly useful in video-telephone subscriber stations where the contrast and brightness controls comprising potentiometers are located at a point outside the image receiver for independently controlling the contrast and brightness adjustment of the receiver whereon a picture is projected line by line. The method comprises adding a "white" pulse to the picture signal for each line, the amplitude of this pulse corresponding to the maximum effective voltage for white, so that the portion of the picture to be reproduced at the desired maximum luminance is clamped to a value (or white level) adjustable relative to the maximum value of the white pulse; shifting the porch of the white pulse by varying the gain of an amplifier to which the picture signal including the added white pulse is applied by means of a contrast control, the difference between the white level and the maximum value of the white pulse being left unchanged; and adjusting the distance between the maximum value for white and the white pulse while maintaining said porch substantially constant by varying the gain of said amplifier using said brightness control.

10 Claims, 6 Drawing Figures

METHOD AND CIRCUIT ARRANGEMENT FOR INDEPENDENTLY CONTROLLING THE CONTRAST AND BRIGHTNESS ADJUSTMENT OF AN IMAGE RECEIVER, MORE PARTICULARLY IN VIDEOTELEPHONE SUBSCRIBER STATIONS

BACKGROUND OF THE INVENTION

In television, contrast is the ratio between maximum and minimum luminance values in a television picture, that is to say, the luminance range of the image. In conventional circuits the modulation of the picture tube is varied by means of the contrast control. Since this modulation normally does not occur with respect to the point at which the beam current of the picture tube equals zero (a working point displacement being effected by means of the brightness control), there are also undefined displacements of the luminance area in addition to the changes of contrast. Thus, the contrast control also causes changes of brightness.

A clear change of brightness would have to be effected by a shift of the luminance area, with the luminance range (contrast) remaining constant. In prior circuits the brightness control shifts the working point of the picture tube by governing the Wehnelt bias. However, this is accompanied by a change of position of the signal on the characteristic curve which, due to the characteristic curvature, in addition to the resulting change of brightness, also results in a considerable change of contrast.

Since in circuits of known construction the two controls have a mutual influence upon each other, the contrast control, according to this principle, must also be operated in addition to the adjustment of the brightness control. In view of the comparatively short duration of a video-telephone call, to which this invention is especially applicable, such adjustment is time-consuming and complicated, the more so since the ambient brightness in a video-telephone set varies much more frequently than in the case of television which for entertainment purposes is frequently used in a darkened room.

It is an object of the invention to provide a method and a circuit arrangement enabling separate adjustment of the contrast and the brightness without causing them to influence each other.

This article "Contrast, Brightness and Gamma—-Their Relation with the Gradation of Television Pictures," Kino-Technik 19 (1965), pp. 199–204, describes a technique of transmitting along the light reference zero level. According to the author, this is not a disadvantage, because in practice there is no dependable criterion for exactly shifting a reference point which has been transmitted along with the signal to the zero point of the characteristic curve of the picture reproduction tube light reference point during reproduction. In television this would have to occur after the presentation so that adjustment to the zero reference point of light would be limited to an exceptional theoretical case.

Contrast and brightness controls have likewise developed which allow separate control of these two parameters. However, these controls use two potentiometers over which the high-frequency broadband picture signals are guided. If the controls are located in the apparatus, this solution is possible. However, if remote control is necessary for adjusting the brightness and contrast as, for example, in the case of a video-telephone set, considerable difficulties will arise, because in order to avoid trouble two shielded circuits must be guided to the potentiometers, requiring the use of expensive special shielded cables. True, it is also possible to work with remotely controlled powered potentiometers or with photo resistances and lamps. In the first instance, this results in comparatively large assemblies using engines, gears and limit step mechanisms, and control elements. In the second case, the large tolerances of the photo resistances and the gradual blackening of the lamp globe result in a gradual deterioration of the quality of the control device.

SUMMARY OF THE INVENTION

The invention relates to a method and a circuit arrangement for independently controlling the contrast and brightness adjustment of a facsimile receiver, which is especially useful in videotelephone subscriber stations, the control being provided by means of potentiometers from a point outside the apparatus.

The problem is solved by the invention by the following steps: in the image receiver a pulse is added to the picture signal (BAS) for each line, the amplitude of which corresponds to the maximum effective signal voltage for "white"; the picture to be reproduced is clamped at the desired maximum luminance to a value (white level) fixed at an adjustable distance from the maximum value of the added white pulse; by means of a contrast control the gain of an amplifier over which the picture signal (BAS) runs with the added white pulse can be varied so that during adjustment thereof the distance between the white level and the maximum value of the white pulse is left unchanged and only the porch of the pulse is shifted; and, by means of a brightness control the gain of the same amplifier can be varied so that during adjustment the distance between the maximum value and the white pulse changes, but the value of the porch remains substantially the same.

It is also provided that with the contrast control and brightness controls only the white level or the black level is shifted. This is done in accordance with the invention by adding the white pulse to which the picture signal is clamped. This renders unnecessary the readjustment of the second control after it has previously been set to the desired value and results in a reduction of the transient response, which is particularly important in image receivers with a comparatively short viewing time and frequently varying luminance of the environment.

According to a further development of the invention, the added white pulse is arranged on the back porch of the vertical-blanking period. In this way, the additional pulse does not impair the pure picture signal, and the luminance value from which is derived the subjective white level onto which the picture signal shall be clamped is available in the vertical-blanking period.

Another development of the invention provides that the picture signal BAS is adjusted in a variable-gain amplifier to a constant amplitude relative to the sync pulse to adding the white pulse. This is necessary, due to the variations of the insertion loss of the transmission path, because a constant maximum white level is thereby ensured which admits of the addition of a constant white pulse having an established relationship thereto.

BRIEF DESCRIPTION OF THE DRAWINGS

The foregoing and other objects of the invention will be more readily understood by reference to the description of a preferred embodiment given hereinbelow.

Figure 1:
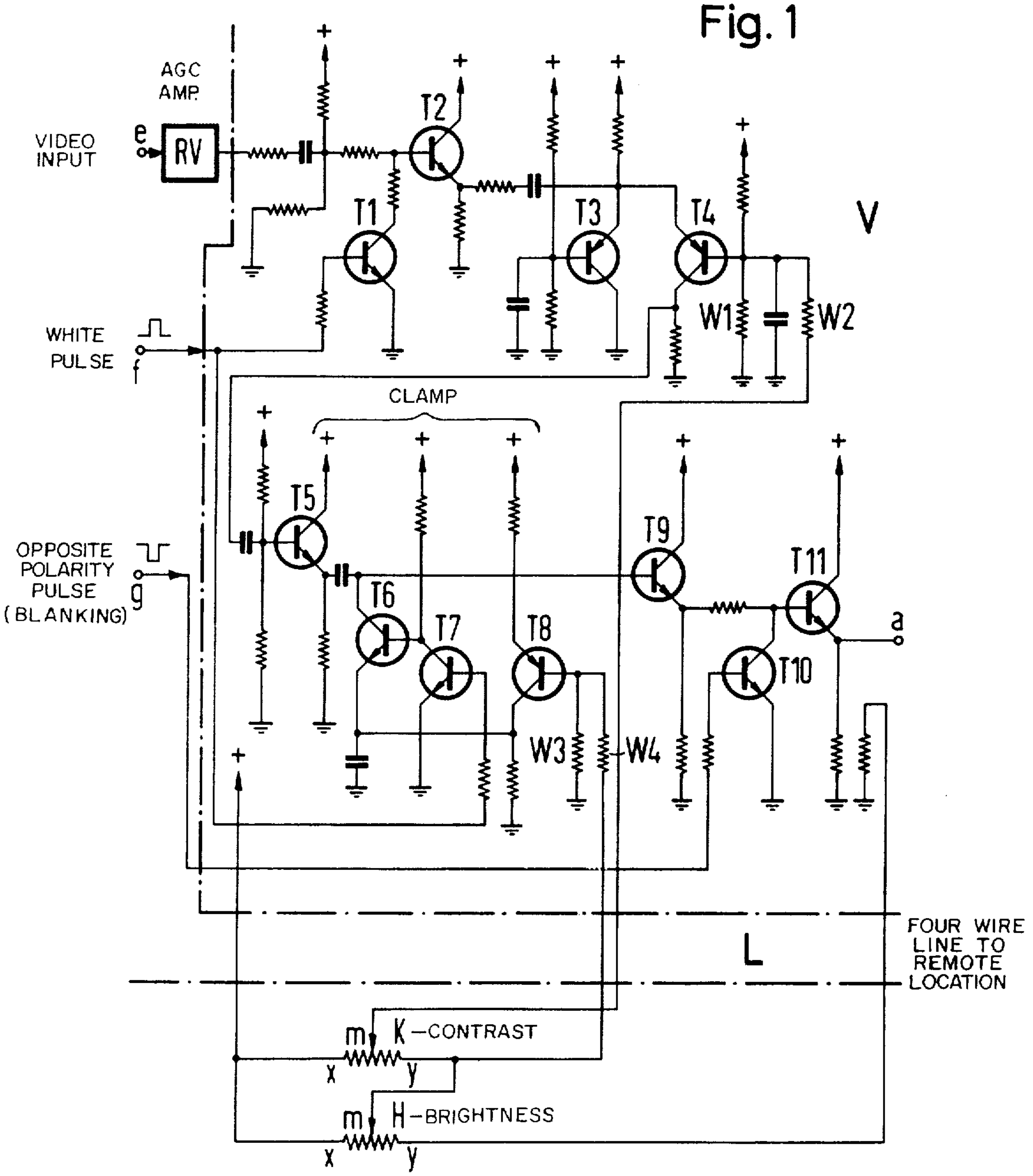
FIG. 1 is a schematic diagram of an amplifier circuit contructed according to the invention. The mode of operation of an amplifier such as shown in FIG. 1 will be described by reference to FIGS. 2 to 6.

DESCRIPTION OF A PREFERRED EMBODIMENT:

In FIG. 1 is shown a circuit arrangement having the essential features of a preferred embodiment of the invention. Only details of the circuit are shown in this circuit arrangement which are necessary for understanding the invention. The specific parameters of the individual resistances for generating bias voltages across the individual transistors, of which 11 are shown, of the capacitors and the like are easily developed by those skilled in the art, so that no further details are given. This circuit arrangement is comprised of an amplifier V preceded by a variablegain amplifier RV, a four-wire line L connecting the amplifier V to the contrast control K and the brightness control H by which the contrast and the luminance of the picture can be varied by remote control. Moreover, this circuit arrangement also comprises a device (not shown) which generates according to principles well known in the art at a very specific point of time within the vertical-blanking period a pulse of predetermined length and potential and applied to the input terminal *f*. At the same time this apparatus supplies to the terminal g a pulse having opposite polarity.

Figure 2:
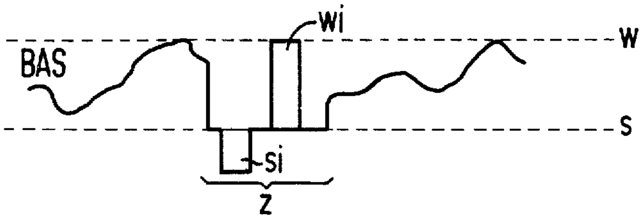
Figure 3:
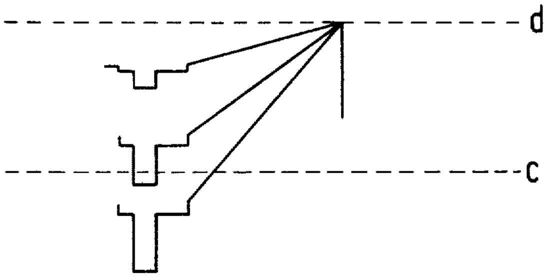

The signal BAS received and prepared in devices of known construction reaches the circuit arrangement shown in the drawing at the input terminal *e*. Since the level of this signal can fluctuate widely as a function of the transmission path, it is set in the variable-gain amplifier RV to a constant value, say, 1 Vss. This value is measured at the sync pulse si in a known manner (FIG. 2).

As described hereinabove, a pulse having a constant shape and duration is applied to the input terminal *f*. This pulse *wi* has an amplitude corresponding to the maximum effective voltage for white. FIG. 2 shows a curve tracing of the signal BAS, including a vertical-blanking interval z. In this vertical-blanking interval the electron beam is suppressed and runs after it has written one line on the viewing screen, to the starting point of the next line. In this vertical-blanking interval *z* the porch s representing the reference value for the darkest framing, as well as the sync pulse *si* referred to hereinabove, is transferred to the image receiver.

According to the invention, in each vertical-blanking interval *z* there is added what is denominated herein a white pulse *wi*, on the back porch. FIG. 2 shows that the brightest spots of the picture have the same luminance w as the added white pulse *wi*.

The white pulse wi is added, via the transistor T1, into the BAS signal (FIG. 1). The transistor T2 acts as an impedence converter for the gain control by means of the transistors T3 and T4.

The tap m of the contrast control K is connected via the resistance W2 to the base of the transistor T4. These resistances form with the resistance W1 a voltage divider over which the operating point of the transistor T4 on its characteristic curve, that is to say, the amplification factor of amplifier V, is adjusted.

The clamp consisting of the transistors T5, T6 and T7 is connected to the aforementioned adjustable amplifying component. In this clamp the output signal of the preceding amplification stage is clamped to a value having a defined difference from the white pulse *wi*, as will be explained hereinbelow. The necessary conditions for correct contrast adjustment are achieved as a result of this clamping.

The contrast control K includes a potentiometer linked with its end *x* to the positive potential which also feeds the transistors. The other end *y* of the contrast control K leads, via the resistances W4 and W3, to the other potential of the amplifier V. The tap m of the brightness control H is connected to the end *y* of the contrast control K so that, when the brightness control H is operated, the potential across the base of the transistor T8, which is connected with the common point between the resistors W3 and W4 is adjusted. The ends *x* and *y* of the potentiometer of brightness control H are connected across the operating potential of the amplifier V.

Thus, the line L connecting the two controls with the amplifier V consists solely of four wires which carry, in a non-critical manner, direct current only, and thus, need not be shielded or specially constructed.

By varying the tap *m* of the brightness control, the potential at point *y* of the contrast control K, and thereby at the base of the transistors T4 and T8, is also varied.

In this way both the gain control of the transistors T3 and T4 and the terminal voltage of the clamp are varied. By turning the brightness control H the signal amplitude is changed, that is, the amplitude of the added white pulse. As a result of the clamping onto the latter the porch would be pulled toward the potential for "white." This is prevented by an oppositely directed change of the clamping potential by means of the transistor T8, thereby causing an apparent clamping to the porch.

The black level s (FIG. 2) of the picture signal corresponds to the cut-off point. This point *c* indicates the control potential of the picture tube where the beam current becomes zero, that is to say, the tube is pinched off.

Because of the added-in white pulse on the back porch, under certain circumstances, the picture tube could be modulated to brightness during the line flyback or retrace period; therefore, it is blanked by virtue of the fact that the negative impulse synchronized to pulse *wi* and applied to input *g* and then to transistor T10 shorts the signal to chassis ground.

The final vertical scanning stage of the receiver is then accessed via the impedance converter T11 and the output terminal *a*.

The mode of operation of the two controls K and H will be more readily understood by reference to the description of a preferred embodiment given hereinbelow in conjunction with the FIGS. 3 to 6. Starting from the maximum value for the brightness, first the contrast control K shall be changed. The white level of the picture signal which corresponds to the amplitude of the white pulse wi remains clamped onto the line *d* shown in FIG. 3. By varying the contrast control, however, the porch and the sync pulse *si* are shifted and may even be lower than the cut-off point *c*. In this case, the lower shades of grey are cut off and the picture becomes indistinct. The distance between the porch and the line

*d* indicates the contrast of the picture, i.e., the difference in brightness between the brightest and the darkest point of the image.

Figure 4:

In FIG. 4 one proceeds from two different contrast adjustments and the brightness shall now be varied. The contrast in the left set of curves is great, whereas it is small in the right set of curves. Now, by adjusting the brightness control H the brightest point of the picture is not retained in the line *d* but, depending upon how far the brightness button is turned, it is shifted toward the cut-off point. Since in the left group of curves the porch already lies below the cut-off point *c*, the darkest point is pulled up slightly toward point *c* while, according to the right group of curves in FIG. 4, the darkest picture value in the final position of the brightness control is pulled down only slightly toward point *c*. The darkest picture value of the white level tend towards the cut-off point c upon adjustment to "zero" brightness.

Figure 5:
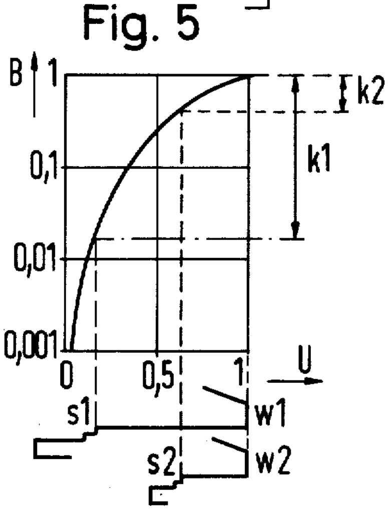
Figure 6:
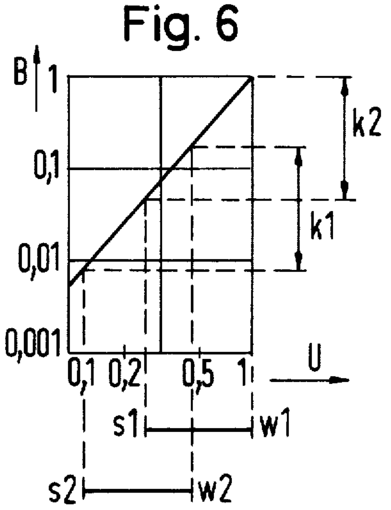

Taking into consideration the characteristic curvature of the picture tube, changes occur as shown in FIGS. 5 and 6. When the contrast changes the contrast on the picture tube between the values $s1$ and $w1$ or $s2$ and $w2$ varies, thereby rendering visible the contrast differences $k1$ or $k2$.

When the brightness changes, that is, upon shifting the voltage V from the position $s1-w1$ to the position $s2-w2$, the contrast $k1$ and $k2$ is maintained, even if the total image is comparatively dark.

I claim:

1. A method of independently adjusting the contrast and brightness of an image receiver whereon a picture is projected line by line, particularly in video-telephone subscriber stations, said contrast and brightness controls comprising potentiometers located at a point outside the apparatus; comprising:

adding a white pulse to the picture signal during the line blanking interval for each of said lines, the amplitude of said pulse corresponding to the maximum effective voltage for white, shifting the porch of the white pulse by varying the gain of an amplifier to which the picture signal including said added white pulse is applied by regulating the dc bias thereof by means of said contrast control, the difference between the white-level and the amplitude of the white pulse being left unchanges, and adjusting the distance between the white level and the amplitude of the white pulse while maintaining said porch substantially constant by varying the gain of said amplifier by regulating the dc bias thereof using said brightness control the desired maximum white level of the picture being clamped to a level which is an adjustable distance from the amplitude of the inserted white pulse, the porch remaining at substantially the same unclamped value during adjustment of said brightness control.

2. The method as set forth in claim 1, including the step of initially adjusting the picture signal in a variable-gain amplifier (KV) to a constant amplitude at the time of occurrence of a synchronizing pulse (si) transmitted in said picture signal.

3. The method as set forth in claim 1, including the step of suppressing said white pulse at the output of said amplifier by the addition of a synchronous pulse of equal amplitude via another input of said amplifier.

4. A circuit arrangement including brightness and contrast control means including potentiometers for adjustment of an image receiver wherein a picture is projected line by line, particularly in video-telephone subscriber stations, and including amplifier means for receiving and controllably amplifying said picture signal means in said amplifier means for adding a white pulse to the line blanking interval of the picture signal for each line, the amplitude of said pulse corresponding to the maximum effective voltage for white, said amplifier including means for clamping the white value picture signal to be reproduced to a value relative to said maximum value of said white pulse, said contrast control means being coupled to said amplifier to control by controlling the dc bias thereof the gain applied to said picture signal carrying said white pulse, the porch of the white pulse thereby being shifted, the distance between the white level of the picture signal and the amplitude of the white pulse being unchanged, said brightness control being coupled to said amplifier to vary the gain thereof by controlling the dc bias thereof to adjust the distance between the maximum value for said picture signal and the amplitude of the white pulse, the value of the unclamped porch remaining substantially the same.

5. The circuit arrangement as claimed in claim 4, wherein the tap of said brightness potentiometer is connected to the base input of said clamping means the ends of said potentiometer being connected between said amplifier supply and said ground.

6. The apparatus of claim 4 including a variable gain amplifier means in said picture input for setting said line signal to constant amplitude at the time of occurrence of a constant amplitude synchronizing pulse.

7. The apparatus of claim 6, wherein said amplifier includes first and second pulse inputs receiving pulses of substantially equal amplitude and of opposite polarity, one of said pulses comprising said line pulse, and said amplifier including means coupled to said first and second inputs for combining said pulses and thereby suppressing said white pulse.

8. The circuit arrangement as claimed in claim 4, wherein said contrast control potentiometer is connected with one end directly to the supply potential of said amplifier means the tap of said contrast potentiometer being connected to a first transistor of said amplifier means for controlling amplification of said picture signal.

9. The circuit arrangement as claimed in claim 8, wherein the tap of said brightness potentiometer is connected to the base input of said clamping means.

10. The circuit arrangement as claimed in claim 8, wherein the other end of said contrast control potentiometer is connected to the base of a second transistor and thereby to said clamping means, the tap of said brightness control being coupled to said other end of said contrast control potentiometer.

* * * * *